United States Patent [19]

Illy et al.

[11] Patent Number: 5,143,350
[45] Date of Patent: Sep. 1, 1992

[54] GATE VALVE

[75] Inventors: Alois Illy, Limburgerhof; Heinz-Jürgen Ruckert, Grossniedesheim, both of Fed. Rep. of Germany

[73] Assignee: KSB Aktiengesellschaft, Frankenthal/Pfalz, Fed. Rep. of Germany

[21] Appl. No.: 730,863
[22] PCT Filed: Jan. 12, 1990
[86] PCT No.: PCT/EP90/00067
  § 371 Date: Jul. 22, 1991
  § 102(e) Date: Jul. 22, 1991
[87] PCT Pub. No.: WO90/08276
  PCT Pub. Date: Jul. 26, 1990

[30] Foreign Application Priority Data
Jan. 21, 1989 [DE] Fed. Rep. of Germany .... 3901695.1

[51] Int. Cl.$^5$ .............................................. F16K 3/00
[52] U.S. Cl. .................................... 251/326; 137/315; 137/375; 251/267
[58] Field of Search ................ 137/375, 315; 251/267, 251/326, 328, 329

[56] References Cited
U.S. PATENT DOCUMENTS

| | | | |
|---|---|---|---|
| 2,420,849 | 5/1947 | Wilson | 251/326 |
| 3,662,778 | 5/1972 | Leopold et al. | 251/326 X |
| 3,963,214 | 6/1976 | Hackman et al. | 251/326 |
| 4,162,058 | 7/1979 | Ellis | 251/326 |

FOREIGN PATENT DOCUMENTS

| | | |
|---|---|---|
| 934735 | 10/1955 | Fed. Rep. of Germany . |
| 2430537 | 10/1975 | Fed. Rep. of Germany ...... 251/326 |
| 713119 | 10/1931 | France .............................. 251/328 |
| 975736 | 3/1951 | France . |
| 2266069 | 10/1975 | France . |
| 2146742 | 4/1985 | United Kingdom . |

Primary Examiner—Gerald A. Michalsky
Attorney, Agent, or Firm—Peter K. Kontler

[57] ABSTRACT

A gate valve has a one-piece casing which contains a valve chamber. The casing is provided with a tubular stub on either side of the chamber, and the stubs serve to connect the valve to a pair of pipes. The chamber has a non-circular sealing surface which is inclined to the direction of flow. A valving element having a non-circular sealing surface complementary to the sealing surface of the chamber is insertable in the latter via a selected one of the stubs. Following insertion, the valving element is connected to a spindle. Both the valving element and the spindle are held against rotation, and movement of the valving element towards and away from the sealing surface of the chamber is achieved by a rotary nut which is threaded onto the spindle. The sealing surface of the valving element delimits a region having a maximum dimension greater than the maximum dimension of the selected stub as considered in planes normal to the flow direction.

12 Claims, 1 Drawing Sheet

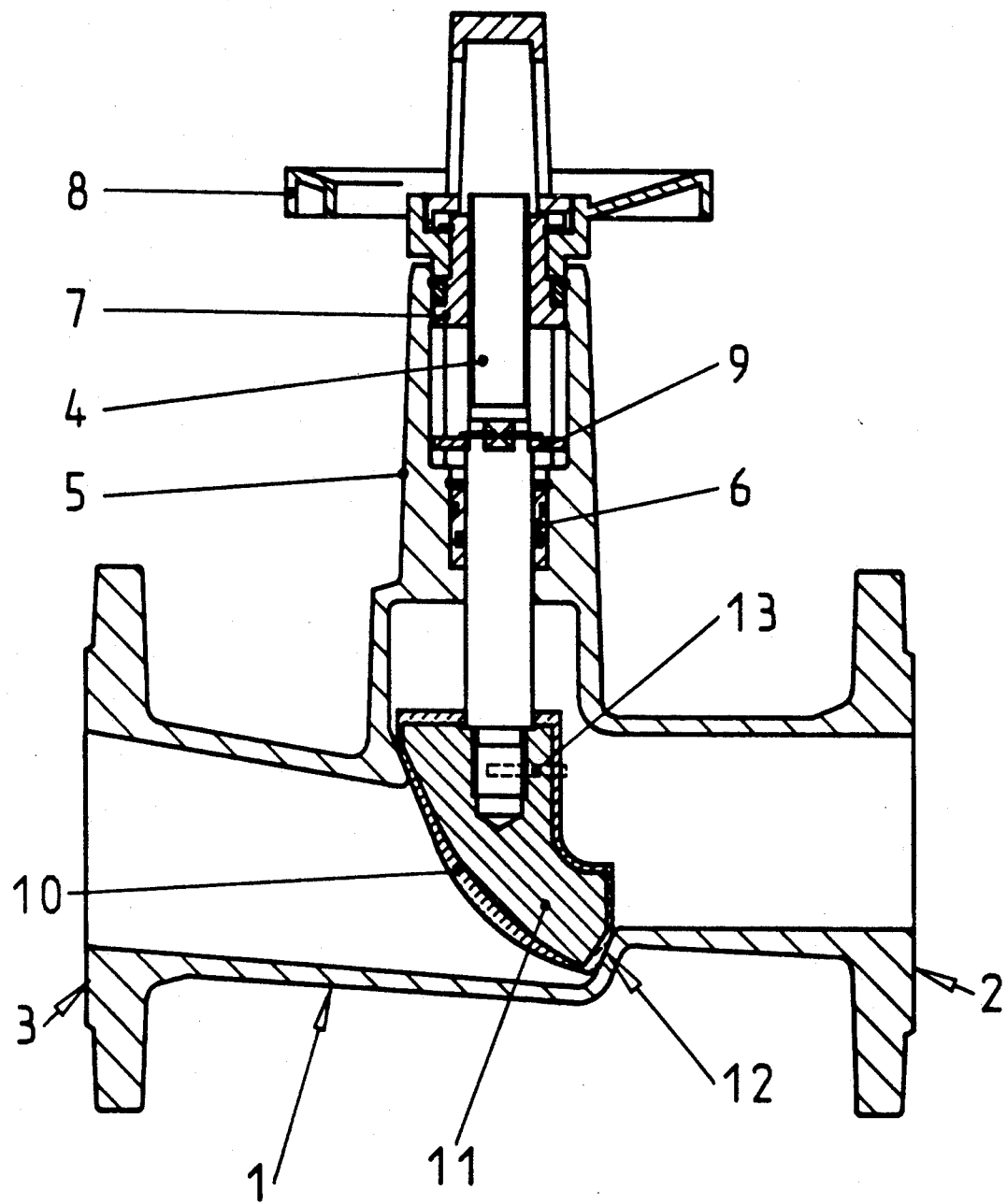

GATE VALVE

BACKGROUND OF THE INVENTION

The invention relates to a one-piece armature housing.

Such an armature is known from the French patent application 2,266,069. In order to permit mounting of the closing wedge inside the housing, the latter exhibits the characteristic that, of the two connecting pipes between which the sliding wedge is to be disposed so as to form a seal, only one is equipped with a seating ring. The housing parts holding the seating ring, as well as the seating ring, reduce the flow cross section which is smaller than the nominal width of the armature. These components are missing at the opposite connecting pipe thereby making it possible to insert the sliding wedge in the housing. For the sliding wedge to maintain pressure against the seating ring, the pressure connection without a seating ring is provided with two inclines which are transverse to the flow direction and lie opposite one another. These cooperate with suitable protrusions on the sliding wedge to thus maintain pressure in the closed position. The inclines must have dimensions which, on the one hand, permit reliable pressing to be achieved and, on the other hand, permit passage of the sliding wedge and connection thereof to the driving spindle.

Since, for installation, the valving element must be smaller than the cross section of the openings in the couplings, the corresponding seat cross section is consequently relatively small and the ratio of coupling cross section of the armature housing to seat cross section exceedingly unfavorable. Taken in conjunction with the requisite protruding inclines, this results in a poor flow coefficient zeta.

OBJECT OF THE INVENTION

For gate valves of the type indicated at the outset, it is an object of the invention to obtain a significantly better relationship between flow cross section and seat cross section for the same valve size while, at the same time, improving the flow characteristics.

SUMMARY OF THE INVENTION

In surprising fashion, this object is achieved in that the valve seat is non-circular, particularly oval, and that a valving element which cooperates therewith has a non-circular sealing surface whose largest dimension is greater than the largest dimension of the opening cross section of the coupling used for installation.

In this manner, a ratio of 1:1 can be obtained between coupling cross section, which corresponds to the cross section at nominal width, and seat cross section. Together with the inclined disposition of the seating surface, an exceedingly advantageous flow coefficient is thus achieved. The flow coefficient is significantly less than half that of a normal valve thereby making substantial energy savings possible.

An embodiment of the invention provides for the valving element to have one or more guide cams which are known per se and abut one or more guides in the housing so as to prevent rotation. The guides can here be designed as ridges embraced by cams or protrusions, a groove which receives a cam or the like, and so on.

An embodiment of the invention provides for the valving element to be equipped with a non-rotary spindle. This assures reliable positioning of the valving element in the valve seat.

Other embodiments of the invention include different types of means for preventing rotation of the valving element. Thus, for one, the housing can have an internal contour which is oval, for instance, and permits the non-circular valving element to perform a stroke while simultaneously inhibiting rotation of the same. It is also possible to provide, between the valving element and the spindle, means such as a pin or the like, by way of example, for the prevention of rotation.

Another embodiment provides for the valving element to have a yieldable, sealing overlay. The valving element is then protected and a reliable sealing action is obtained even, for instance, in cast armature housings having unworked seating surfaces.

To protect the connection between spindle and valving element, a further embodiment provides for the yieldable, sealing overlay to abut and establish a seal with the spindle which is connected to the closure. By way of example, this can be accomplished in a simple manner by elastic abutment against an appropriately designed spindle segment.

According to another embodiment of the invention, the side of the valving element facing the valve seat has a convex arch which, in dependence upon the flow direction, and in conjunction with the housing wall flanking the valve seat, defines a nozzle-shaped or diffuser-shaped flow cross section. This functions to additionally improve the flow characteristics. If the medium to be blocked here flows towards the underside of the valving element, a nozzle-shaped flow cross section results. In the reverse case where the medium flows towards the upper side of the valving element, which is provided with the connection to the spindle, a flow cross section widening like a diffuser is obtained.

BRIEF DESCRIPTION OF THE DRAWING

An exemplary embodiment of the invention is illustrated in the drawing and is described below in detail. It shows a section through a closed armature.

DESCRIPTION OF PREFERRED EMBODIMENTS

The illustrated housing 1 has a one-piece, cast construction and requires machining only of the flanges 2,3 and housing neck 5 which here accommodates a non-rotary spindle 4. The seat of the valve is inclined to the flow direction and is preferably unworked. A packing cartridge 6 made up of one or more parts bears against the spindle 4 and makes sure that there is a seal between the housing interior and the atmosphere. The transverse forces are absorbed by this packing cartridge or a special bearing. A spindle nut 7 rotatably supported in the housing neck 5 and movable by means of a handwheel effects lifting and lowering of the spindle 4. The latter has an arresting block 9 which is guided in the housing neck 5 and prevents rotation of the spindle 4.

For installation, the valving element 11 with a yieldable, sealing overlay 10 is admitted into the housing 1 from the side of the flange 2 and placed in the valve seat 12. The spindle 4 is then introduced into the housing 1 from externally and coupled to the valving element 11; in the illustrated exemplary embodiment by a screw connection. The yieldable, sealing overlay 10 here lies against, and establishes a seal with, the spindle 4 and reliably prevents arrival of the medium to be blocked at the valving element-spindle connection. Depending upon the type of means for preventing rotation, a pin functioning as a means 13 for the prevention of rotation can also be placed between spindle 4 and valving element 11. It is further possible to use other and conventional elements for the prevention of rotation. The packing cartridge 6 is positioned in the housing prior to introduction of the spindle 4. Subsequently, the arresting block 9 and the spindle nut 7 can be placed by means of the handwheel 8.

Moreover, the portion of the housing in which the valving element 11 performs the stroke can have dimensions which effectively prevent rotation of the valving element. In accordance with the non-circular shape of the valving element, the housing will have a shaft which is likewise non-circular. The valving element is movable inside the latter with little lateral play. Alternatively or additionally, guides which are known per se can also be used.

We claim:

1. A valve, comprising a one-piece housing which defines a chamber and a flow path intersecting said chamber and having a section to one side of the chamber, said chamber being provided with a first non-circular sealing surface; and a valving element insertable into and withdrawable from said chamber through said flow path and having a second non-circular sealing surface which is substantially complementary to said first sealing surface, said valving element being movable in said chamber between a first position in which said second sealing surface engages said first sealing surface to obstruct said flow path and a second position in which said second sealing surface defines a clearance with said first sealing surface, said section of said flow path having a first maximum dimension as considered in planes normal to said flow path, and said second sealing surface delimiting a region having a second maximum dimension greater than said first maximum dimension.

2. The valve of claim 1, wherein said first sealing surface is inclined to said flow path.

3. The valve of claim 1, wherein said sealing surfaces are substantially oval.

4. The valve of claim 1, comprising means for preventing rotation of said valving element.

5. The valve of claim 1, wherein said valving element is provided with first guide means and said housing is provided with second guide means arranged to cooperate with said first guide means so as to inhibit rotation of said valving element.

6. The valve of claim 1, further comprising a spindle connectable with said valving element, and means for inhibiting rotation of said spindle.

7. The valve of claim 1, wherein said housing has an internal configuration which inhibits rotation of said valving element.

8. The valve of claim 1, further comprising a spindle connectable with said valving element, and means for inhibiting relative rotation of said spindle and said valving element.

9. The valve of claim 1, wherein said valving element is provided with a yieldable overlay.

10. The valve of claim 9, further comprising a spindle which is connected with said valving element, said overlay engaging said spindle and establishing a seal therewith.

11. The valve of claim 1, wherein said valving element has a convex side which is arranged to face said first sealing surface.

12. The valve of claim 1, wherein said valving element and said housing are configured so that said clearance resembles a nozzle as considered in a first direction along said flow path and a diffuser as considered in an opposite second direction along said flow path.

* * * * *